United States Patent Office 2,895,215
Patented July 21, 1959

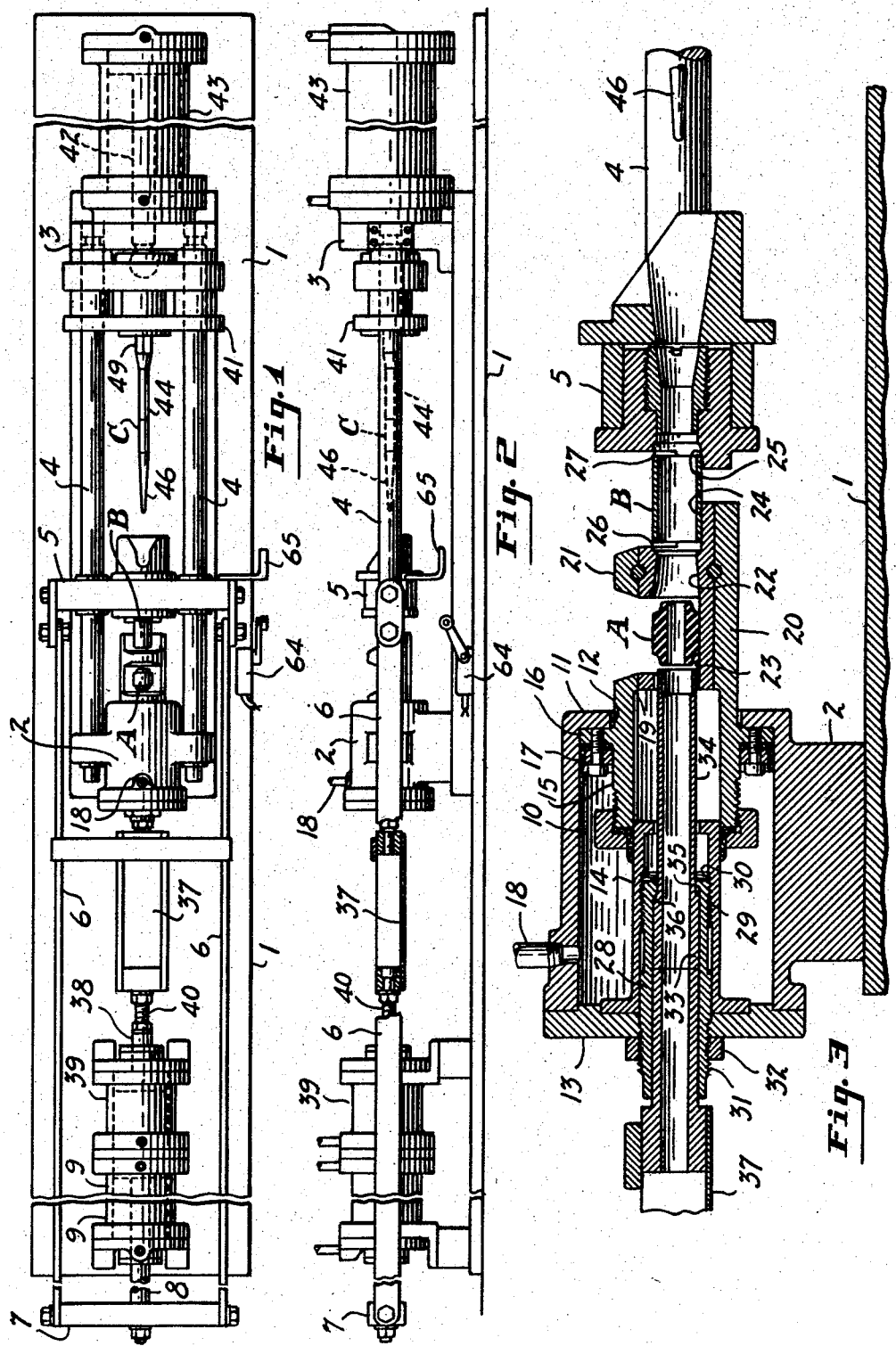

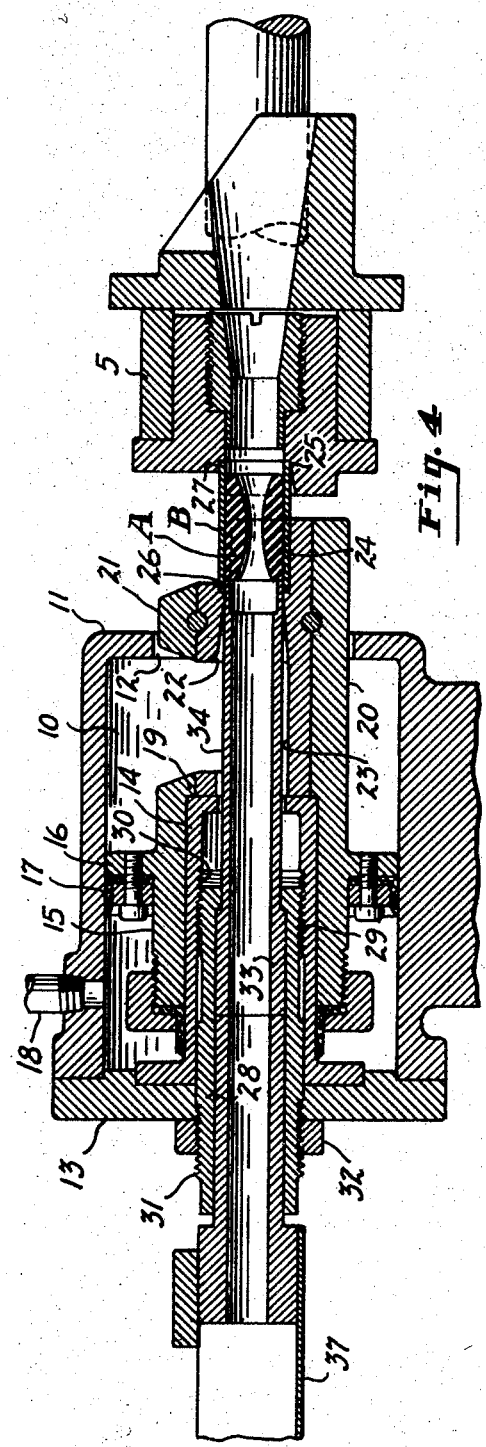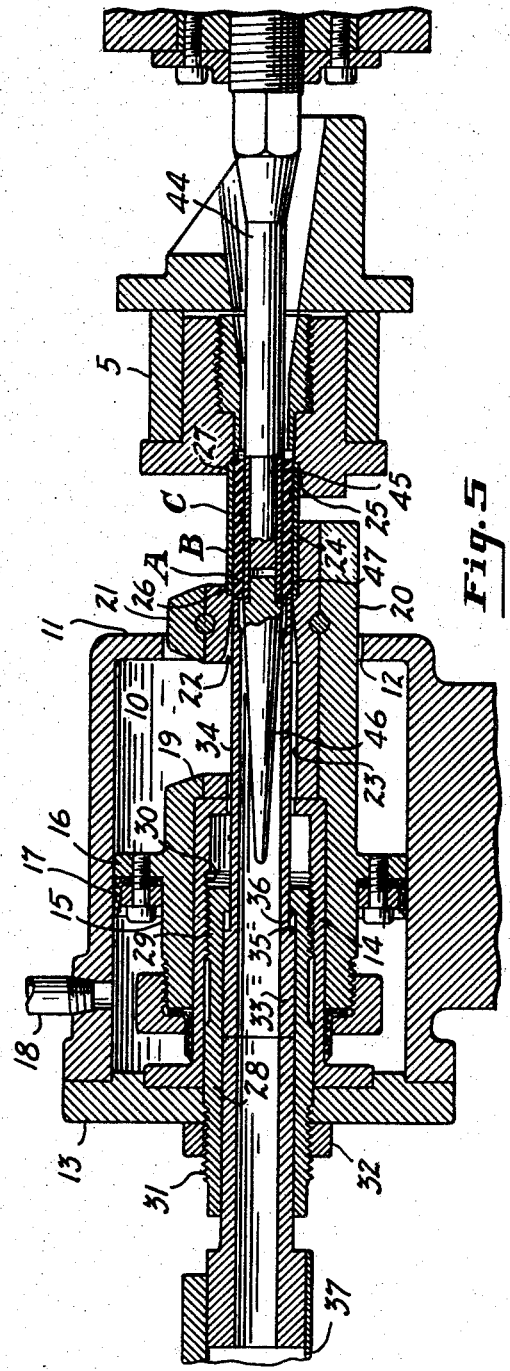

2,895,215

MACHINE FOR ASSEMBLING RESILIENT BUSHINGS AND THE LIKE

Eldon Paul Neher, Logansport, and William Gordon Myers, Kewanna, Ind., assignors to The General Tire and Rubber Company, Akron, Ohio, a corporation of Ohio Application October 17, 1955, Serial No. 540,742

6 Claims. (Cl. 29—235)

This invention relates to machines for assembling a tubular elastic rubber insert under radial compression between a rigid outer tube and an inner rigid core of the type in which the insert and core are inserted in rapid succession into the outer tube from the opposite ends thereof, the rubber insert being forced into one end of the tube and the core being forced into the insert immediately after it has been forced into the outer tube.

In assembling operations of the character referred to, it is desirable that the assembling operations be controlled in such manner as to provide a uniform distribution of stresses in the axially elongated, radially contracted wall of the tubular rubber insert interposed between the outer tube and core and to dispose the core in accurate concentricity with the outer tube.

The machine of the present invention is of the type disclosed in the patents to Beck, No. 2,660,780, December 1, 1953, and Cowles, No. 2,690,001, September 28, 1954, in both of which the elastic rubber insert is forced by a plunger through a funnel-shaped guide into the outer tube and the core is immediately thereafter inserted by pressure into the end of the insert within the outer tube opposite that engaged by the plunger. In the machine of the present invention the insert engaging plunger is acted upon by fluid pressure during the entry of the insert into the outer tube, the pressure applied to the plunger being sufficient to overcome the frictional resistance to passage of the insert through a funnel-shaped guide and into the outer tube. During the core inserting operation which immediately follows, the insert engaging plunger is held against the insert but the fluid pressure acting on the plunger is reduced so that the plunger will yield to permit axial elongation of the insert due to the entry of the core into it. The reduced pressure applied to the plunger during the core inserting operation imposes a resistance to axial elongation of the insert which will prevent undesirable slippage between the insert and the outer tube and which will insure proper radial pressure on the portions of the elongated insert between the end portions of the outer tube and the core. The control of the pressure on the insert engaging plunger is preferably automatic and may be by means of a trip device carried by a member that is moved during the insert entering operation. The trip device may also control the core inserting operation so that the reduction in pressure on the insert engaging plunger and the operation of the core inserting mechanism are simultaneous.

Important objects of the invention are to provide an assembling machine of the character described which produces bushings in which the core is accurately centered with respect to the outer tube, to provide a machine that produces a bushing in which the stresses on the rubber insert are substantially uniform throughout the length and circumference thereof, and to provide a machine which produces fewer assemblies that are defective because of distortion of the rubber insert.

Reference should be had to the accompanying drawings forming a part of this specification, in which:

Figure 1 is a top plan view of a machine embodying the invention;

Fig. 2 is a side elevation of the machine;

Fig. 3 is a fragmentary, longitudinal section on an enlarged scale through the central portion of the machine, showing the rubber insert and outer sleeve positioned for assembling operation;

Fig. 4 is a sectional view similar to Fig. 3, showing the position of the parts after entry of the rubber insert into the outer tube;

Fig. 5 is a sectional view similar to Fig. 3, showing the position of the parts at completion of the assembling operation.

Figure 6:
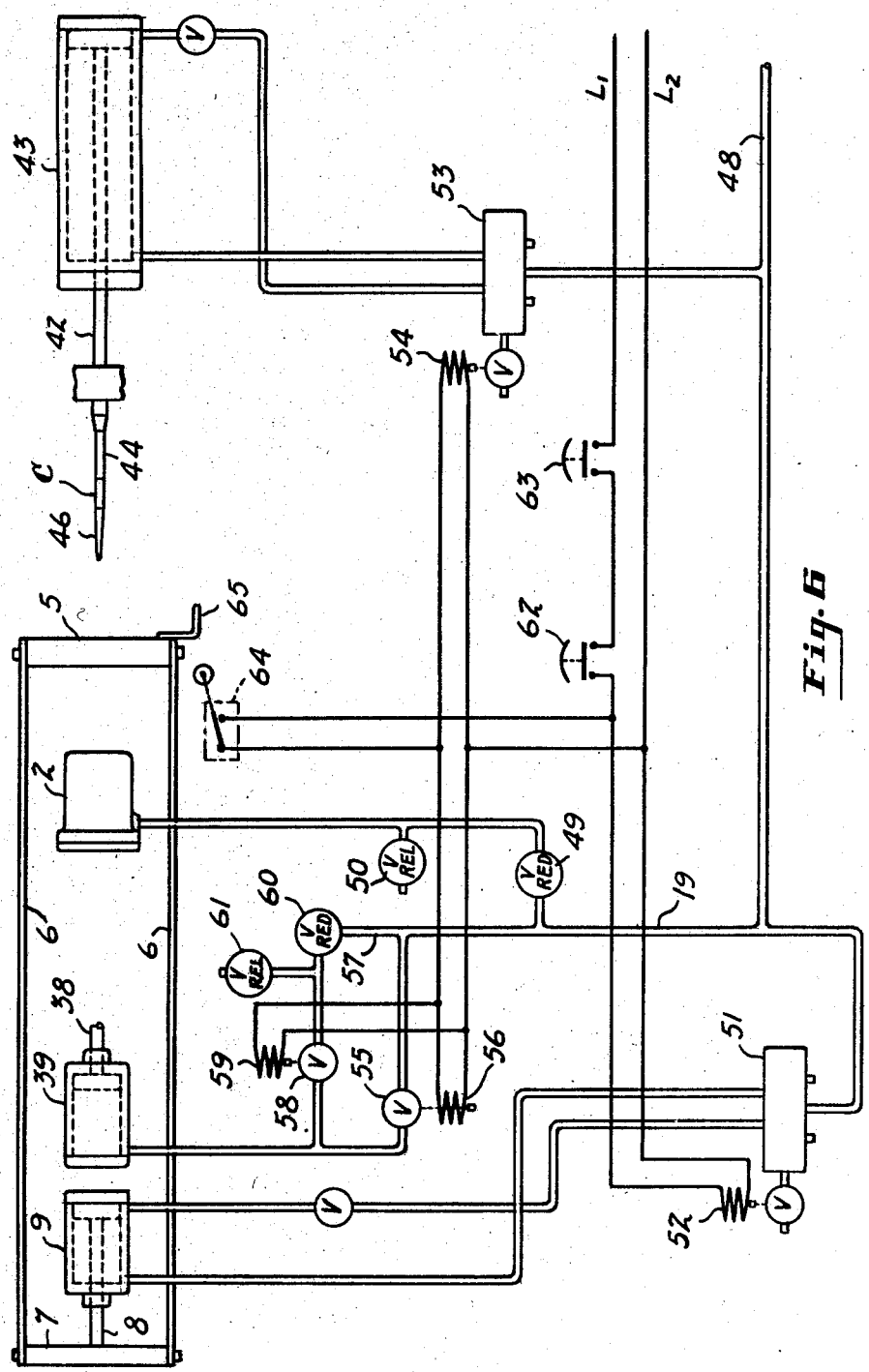
Fig. 6 is a diagrammatic view showing the controls for the fluid pressure operating cylinders.

The machine of the present invention assembles an elastic tubular rubber insert A between an outer tube B and an inner core C as shown in Fig. 5.

As herein shown, the assembling machine is mounted on an elongated supporting bed 1 and includes a head 2 that is fixed to the bed substantially midway between the ends thereof and a head 3 also fixed to the bed adjacent one end thereof. Extending from the head 2 to the head 3 are a pair of parallel horizontal guide rods 4 upon which a crosshead 5 is slidably mounted for movement toward and away from the head 2, the head 5 being actuated by connecting rods 6 that extend from the crosshead 5 to a crosshead 7 attached to the outer end of a piston 8 mounted in a fluid pressure cylinder 9 on the bed 1 parallel to and between the rods 6. The upper portion of the head 2 is formed to provide a horizontal fluid pressure cylinder 10 in alinement with the cylinder 9 which has an integral head 11 at its inner end provided with a central opening 12 and a detachable head 13 at its outer end to which is rigidly attached an inwardly projecting axially disposed guide member 14. The cylinder 10 has a tubular piston 15 mounted therein that has a sliding fit on the guide member 14 and that has a circumferential flange 16 to which a packing ring 17 engageable with the cylinder wall is attached. Fluid under pressure is supplied to the cylinder 10 through a pipe 18 which normally holds the piston in a position where the flanges 16 engage with the head 11. Movement of the piston in the opposite direction is limited by a flange 19 that engages with the inner end of the guide member 14. The piston 15 has an extension 20 that projects through the opening 12, and this extension has top portions that are cut away to provide an upright portion 21 that is provided with a tapering, funnel-shaped opening 22 in axial alinement with the cylinders 9 and 10. Inwardly of the upright portion 21 the extension 20 has an insert receiving recess 23 that serves to support a rubber insert A in axial alinement with the funnel-shaped opening 22 which serves as an insert contracting guide that facilitates the entry of the insert into an outer tube B. Outwardly of the upright portion 21, the extension 20 has a supporting ledge 24 that is alined with a similar supporting ledge 25 projecting inwardly from the inner face of the crosshead 5, the ledges 24 and 25 being formed to support and axially aline an outer tube B with the funnel-shaped guide 22. The opposed faces of the projections 21 and crosshead 5 are recessed to provide sockets 26 and 27 to receive the ends of an outer tube B when the crosshead is moved toward the head 2.

The guide member 14 is tubular in form and an inner guide member 28 is mounted for axial adjustment within the member 14. The inner guide member 28 has an externally threaded inner end 29 that screws into internal threads 30 formed on the interior of the tubular guide 14. The outer end of the inner guide 28 extends through the head 13 and has a threaded outer end 31 that screws into the head 13 and that receives a lock nut 32 to positively hold the guide member in adjusted positions. The inner guide member 28 provides a guide for a tubular plunger 33 that has a sliding fit therein, the plunger 33 having an inner portion 34 of slightly reduced diameter that is in axial alinement with the funnel guide 22. Stop shoulders 35 and 36 on the plunger 33 and guide member 28 serve to limit the inward movement of the plunger 33. The plunger 33 is connected through a trough-shaped member 37 to a piston 38 axially alined therewith and operating in a fluid pressure cylinder 39. An adjustable connection 40 may be provided between the piston 38 and the member 37 to vary endwise movement permitted the plunger 33.

When the crosshead 5 is moved toward the head 2 by means of the fluid pressure cylinder 9, the tube B is clamped between the crosshead and the extension 20 of the piston 15 and held in registry with the small end of the funnel guide 22 and in axial alinement therewith. Continued movement of the crosshead 5 moves the piston 15 toward the outer end of the cylinder 10, causing the projecting portion 21 to press the insert against the inner end of the tubular plunger 33. The cylinder 39 maintains a pressure on the plunger 33 sufficient to overcome the friction between the insert A and the funnel guide 22 so that the insert A is pushed through the funnel guide 22 and into the outer tube B as the crosshead is moved toward the head 2, and moves the piston 15 to its outer limit of movement as shown in Fig. 4, in which position the rubber insert A is fully entered into the outer tube B.

A crosshead 41 is slidably mounted on the rods 4 between the head 3 and the crosshead 5, the crosshead 41 being moved toward and away from the crosshead 5 by means of the piston 42 of a fluid pressure cylinder 43. The crosshead 41 carries a plunger 44 that is axially alined with the tubular plunger 33 and with the funnel guide 22. The plunger 44 has a reduced end 45 of a diameter to receive the tubular core C, the reduced end portion 45 being of less length than the core C, so that the core C projects beyond the inner end thereof. A tapered pilot 46 of the same diameter at its outer end at the core C, has a reduced portion 47 that fits in the projecting end of the core C to support the pilot on the core as best shown in Fig. 5.

Fluid pressure is supplied to the operating cylinders from a supply line 48 which may be connected to a suitable source of air or other fluid maintained at a suitable operating pressure as shown in Fig. 6. The pressure supply pipe 18 is connected directly to the line 48 and is provided with a pressure reducing valve 49 and a pressure relief valve 50 which may be adjusted to maintain a desired predetermined pressure in the cylinder 10. A pressure reversing valve 51 is interposed between the pressure line 48 and the cylinder 9, and a solenoid 52 is provided for actuating the valve 51. The valve 51 normally supplies pressure to the outer end of the cylinder 9 to hold the crosshead 5 in the position shown in Figs. 1 and 3. Energization of the solenoid 52 reverses the pressure in the cylinder 9 and moves the crosshead 5 toward the head 2. A pressure reversing valve 53 is interposed between the pressure line 48 and the cylinder 43 and a solenoid 54 is provided for actuating the valve 53. The valve 53 is normally positioned to supply pressure to the inner end of the cylinder 43 to hold the core inserting plunger 44 in retracted position. Energization of the solenoid 54 reverses pressure in the cylinder 43 and moves the plunger 44 inwardly toward the head 2.

Pressure is normally supplied to the cylinder 39 through a normally open valve 55 that may be closed by energization of a solenoid 56. A bypass line 57 is provided through which fluid under pressure may be supplied to the cylinder 39 through a valve 58 that is normally closed but that can be opened by means of a solenoid 59. A pressure reducing valve 60 and a pressure relief valve 61 are provided in the bypass line 57 so that when the valve 55 is closed and the valve 58 is opened the pressure in the cylinder 39 will be reduced. The valves 60 and 61 may be adjusted to provide the desired reduced pressure in the cylinder 39.

Prior to each assembling operation the operator first places a rubber insert A in the recess 23, an outer tube B on the supporting ledges 24 and 25, and a core C and a pilot 46 on the plunger 44, after which the machine is started into operation by means of two palm switches 62 and 63 which are positioned in series with the solenoid 52 so that the solenoid 52 will be energized when the switches 62 and 63 are closed. Energization of the solenoid 52 reverses the pressure to the cylinder 9 to move the crosshead 5 toward the stationary head 2 to clamp the tube B between the crosshead 5 and the piston 15 and to move the piston 15 toward the outer end of the cylinder 10 against the pressure in the cylinder 10, while the tubular plunger 33 is held against endwise movement by the line pressure in the cylinder 39 supplied thereto through the normally open valve 55.

The solenoids 54, 56 and 59 are connected in parallel with the solenoid 52 and are energized only when the switches 62 and 63 and also a limit switch 64 are closed. The switch 64 is normally open and is closed by means of a trip member 65 attached to the crosshead 5 as the crosshead approaches the end of its movement toward the head 2. Closing of the switch 64 energizes the solenoids 56 and 59 to close the valve 55 and open the valve 58 to reduce the pressure of the cylinder 39. The solenoid 54 is simultaneously energized to actuate the core engaging plunger 44 to advance the same to the position shown in Fig. 5 where the core C is positioned within the rubber insert A.

The movement of the plunger 44 is limited by the engagement of the piston 42 with the inner head of the cylinder 43 and the impact resulting from this engagement jars the pilot 46 from the core C and causes the same to be projected axially through the tubular plunger 33 into the trough 37 where it is readily accessible to the operator for use in the next assembling operation. The reduction in the pressure acting on the plunger 33 during the core inserting operation permits the plunger 33 to yield under the axial thrust thereon due to axial elongation of the rubber insert, and this pressure provides sufficient resistance to axial flow of rubber to prevent slippage of the insert in the outer tube which would result in improper positioning, and also insures substantially uniform radial pressure on all portions of the insert.

The equalization of the stresses in the rubber insert due to the yielding pressure exerted thereon by the plunger 33 results in more accurate centering of the core and reduces the number of assemblies that are defective because of distortion of the rubber insert.

It is to be understood that in accordance with the provisions of the patent statutes, variations and modifications of the specific devices herein shown and described may be made without departing from the spirit of the invention.

What we claim is:

1. Apparatus for assembling an elastic tubular rubber insert under radial compression between an outer rigid tube and an inner rigid core comprising means for supporting an insert, an outer tube and a core in spaced relation with the outer tube between the insert and the core, an insert contracting funnel-shaped guide between the insert and outer tube supporting means, means for clamping the small end of said guide to an outer tube and for holding the tube in registry and in axial alinement with said guide, means for moving an insert through said guide into the outer tube including an insert engaging plunger axially alined with said guide and means for applying a fluid pressure to said plunger sufficient to overcome the frictional resistance to the passage of the insert through said guide and into said outer tube, means for pushing a core toward said plunger and into the insert within the outer tube while said plunger is held in engagement with said insert, and means for reducing the fluid pressure acting on said plunger and for maintaining a reduced pressure thereon during the movement of the core into the insert to provide a yielding resistance to axial movement of the insert in the outer tube during entry of the core into the insert.

2. Apparatus for assembling an elastic tubular rubber insert under radial compression between an outer rigid tube and an inner rigid core comprising an insert engaging plunger, an insert contracting funnel-shaped guide in axial alinement with said plunger and having its large end toward said plunger, means for supporting an insert between said plunger and the large end of said guide, means for clamping an outer tube to the small end of said guide and for holding said tube in axial alinement with the guide, means for causing relative axial movement between said guide and said plunger to advance said plunger into said guide to force an insert into an outer tube clamped to said guide, means for applying a fluid pressure to said plunger during said relative movement in a direction to press the same toward said guide and sufficient to overcome the frictional resistance to passage of an insert through said guide and into an outer tube clamped thereto, means for supporting a core in axial alinement with said guide and said plunger and facing the small end of said guide, means for pushing said core toward said plunger and into an insert placed within an outer tube while said plunger remains in engagement with the insert, and means for simultaneously reducing the fluid pressure acting on said plunger and for maintaining a reduced pressure thereon to provide a yielding resistance to axial flow of the insert rubber within the outer tube during the movement of the core into the insert.

3. Apparatus for assembling an elastic tubular rubber insert under radial compression between an outer rigid tube and an inner rigid core comprising means for supporting an insert, an outer tube, and a core in spaced relation and in axial alinement with the outer tube between the insert and the core, an insert contracting funnel-shaped guide between the insert and outer tube supporting means, means for clamping the outer tube to the small end of said guide and for holding said tube in registry and in axial alinement with said guide, a plunger engageable with the end of the insert opposite that toward said guide, means for moving said funnel guide and the outer tube clamped thereto toward said plunger, means for applying fluid pressure to said plunger during movement of said guide toward said plunger sufficient to overcome the frictional resistance to the passage of the insert through said guide and into said outer tube, means for pushing a core into an insert placed within the outer tube while said plunger is held in engagement with the insert, and means for reducing the fluid pressure acting on said plunger and for maintaining a reduced pressure thereon during the movement of the core into the insert to provide a yielding resistance to axial movement of the insert in the outer tube during entry of the core into the insert.

4. Apparatus for assembling an elastic tubular rubber insert under radial compression between an outer rigid tube and an inner rigid core comprising means for supporting an insert, an outer tube, and a core in spaced relation and in axial alinement with the outer tube between the insert and the core, an insert contracting funnel-shaped guide between the insert and outer tube supporting means, means for clamping the outer tube to the small end of said guide and for holding said tube in registry and in axial alinement with said guide, a plunger engageable with the end of the insert opposite that toward said guide, means for moving said funnel guide and the outer tube clamped thereto toward said plunger, means for applying fluid pressure to said plunger during movement of said guide toward said plunger sufficient to overcome the frictional resistance to the passage of the insert through said guide and into said outer tube, means for pushing a core into an insert placed within the outer tube while said plunger is held in engagement with the insert, and means controlled by said guide moving means for reducing the pressure acting on said plunger and for maintaining a reduced pressure thereon to provide a yielding resistance to axial movement of the insert in the outer tube during the entry of the core into the insert.

5. Apparatus for assembling an elastic tubular rubber insert under radial compression between an outer rigid tube and an inner rigid core comprising an insert engaging plunger and a core engaging plunger in opposed relation and in axial alinement, means for supporting an insert, an outer tube and a core between said plungers in axial alinement therewith the outer tube between the insert and the core, a funnel-shaped insert contracting guide between the insert and outer tube supporting means, means for clamping the small end of the guide to the outer tube and for holding said tube in registry with said guide, means for moving said guide and an outer tube clamped thereto toward said insert engaging plunger, means for applying a fluid pressure to said insert engaging plunger opposing the movement of the insert with said guide and sufficient to overcome the frictional resistance to passage of the insert through said guide and into the outer tube clamped thereto, and means controlled by the guide moving means for actuating said core engaging plunger to push a core into an insert placed within an outer tube and engaged by said insert engaging plunger and for simultaneously reducing the pressure acting on said insert engaging plunger and for maintaining a reduced pressure thereon to provide a yielding resistance to axial movement of the insert in the outer tube during entry of the core into the insert.

6. Apparatus for assembling an elastic tubular rubber insert under radial compression between an outer rigid tube and an inner rigid core comprising a tubular insert engaging plunger and a core engaging plunger in opposed relation and in axial alinement, means for supporting an insert, an outer tube, a pilot member and a core in the order named between said plungers in axial alinement with one another and with said plungers, a funnel-shaped insert contracting guide between the insert and outer tube supporting means, means for clamping an outer tube to the small end of said guide and for holding said tube in axial alinement with said guide, means for moving said tube and guide toward said tubular plunger, means for applying fluid pressure to said tubular plunger to resist movement thereof with said guide and sufficient to overcome the frictional resistance of an insert to passage through said guide, and means controlled by said guide moving means for actuating said core engaging plunger to push a core into an insert placed within an outer tube and to push the pilot ahead of the core through said insert and into said tubular plunger and for simultaneously reducing the pressure acting on said insert engaging plunger and for maintaining a reduced pressure thereon to provide a yielding resistance to axial movement of the insert in the outer tube during entry of the core into the insert.

References Cited in the file of this patent
UNITED STATES PATENTS

| | | |
|---|---|---|
| 2,660,780 | Beck | Dec. 1, 1953 |
| 2,683,433 | Schanz | July 13, 1954 |
| 2,690,001 | Cowles | Sept. 29, 1954 |